United States Patent Office 2,746,876
Patented May 22, 1956

2,746,876

OXIDIZED WAX COMPOSITION

Ivor W. Mills, Glenolden, Pa., assignor to Sun Oil Company, Philadelphia, Pa., a corporation of New Jersey No Drawing. Application February 13, 1953,
Serial No. 336,865

3 Claims. (Cl. 106—272)

This invention relates to oxidized petroleum wax compositions particularly suitable for use in compounding emulsion polishes.

The preparation of emulsion polishes for use on floors and other surfaces is well known. Compositions of this kind generally comprise a natural, synthetic or petroleum wax emulsified in water by means of a suitable emulsifying agent which is usually an amine soap such as a triethanolamine or morpholine soap of stearic, oleic, linoleic, lauric, palmitic or other organic acid. When the emulsion is applied to a surface, the water evaporates leaving a waxy film which imparts gloss to the surface. The durability of this film depends upon the hardness of the wax used in preparing the composition. For surfaces such as floors which are subject to scuffing, it is particularly desirable that the wax-containing film be of sufficiently hard character to withstand for a reasonably long time the usual wear to which the surface is subjected.

The present invention involves the use of oxidized petroleum microcrystalline wax in the preparation of emulsion polishes and it provides a means of making a harder composition having greater durability when applied as a surface film. The oxidized wax employed should be one which is relatively hard as indicated by a penetration of less than 15 at 77° F. (A. S. T. M. Method No. D217-44T) and which has a saponification value of at least 30 mg. KOH/g. Preferably the oxidized wax has a melting point of 185-195° F., a penetration of 9-13 and a saponification value of 40-80.

According to the invention, an oxidized microcrystalline wax composition substantially harder than the original oxidized wax is prepared by incorporating into the oxidized wax a minor amount of colloidal hydrophobic silica. The particle size of the silica should be such that the average diameter is less than 0.1 micron. The silica must have been prepared in a way so that it is hydrophobic or water-proof, as more fully discussed hereinafter. The amount of silica incorporated into the oxidized wax can be a very minor amount but should be above a more or less critical concentration in order to secure the desired increase in hardness.

It has now been found that when finely divided silica, as specified above, is added to an oxidized microcrystalline wax having a penetration less than 15, the penetration decreases rather sharply until a certain concentration of silica is reached. Thereafter, further additions of the silica have no apparent effect on the penetration. For example, as the hydrophobic silica is added to an oxidized microcrystalline wax having a penetration in the range of 10-12, the penetration will drop rapidly to a level of 6-8, and thereafter will remain at that level as more silica is added. However, in spite of the increase in hardness as measured by the penetration test, the melting point of the mixture will remain essentially the same as that of the original oxidized wax.

The oxidized wax for use in accordance with the present invention may be prepared according to known procedures for partially oxidizing wax in liquid phase. The starting wax should be a hard microcrystalline wax, preferably having a penetration less than 10 and a melting point in the range of 185-195° F. The wax is heated to a temperature which may range from just above its melting point up to about 300° F., and the molten wax is contacted with air or ozone until the desired degree of oxidation is effected. Preferably the oxidation is conducted in the presence of a suitable catalyst such as a manganese, cobalt, lead or zinc soap of naphthenic, stearic, oleic, palmitic or linoleic acid. The rate of oxidation will depend upon such factors as temperature, type of catalyst, catalyst concentration, air rate, air-wax contacting conditions, etc. Any suitable or known combination of conditions for effecting partial oxidation of the wax to yield a product having a saponification value of at least 30 may be employed to prepare the oxidized wax for use according to the invention. Generally, oxidation of the wax will cause the melting point to decrease and the penetration to increase.

The following examples are illustrative embodiments of the invention:

*Example I*

A microcrystalline wax having a melting point of about 193° F. and a penetration of 5 was oxidized by blowing the wax at a temperature of 240-260° F. with air in the presence of cobalt naphthenate as catalyst. The oxidation was stopped when the saponification value reached 66 mg. KOH/g. Several blends of the oxidized product with minor amounts of hydrophobic silica (particle size about 0.01 micron) were made and penetration values were determined, with the following results:

| Percent silica in blend: | Penetration at 77° F. |
|---|---|
| None | 12 |
| 0.25 | 10 |
| 0.50 | 8 |
| 1.00 | 8 |
| 1.50 | 8 |
| 3.9 | 8 |
| 5.6 | 8 |

These results show that a very small amount of the hydrophobic silica (about ½%) was sufficient to produce the maximum obtainable decrease in penetration, further additions having no effect on penetration.

*Example II*

A microcrystalline wax similar to that described in the preceding example was oxidized until the saponification value was 45 mg. KOH/g. The oxidation product had a penetration of 10. A blend of this product with colloidal hydrophobic silica in amount of 2.9% had a penetration of 6. Further addition of the silica did not appreciably affect the penetration.

The foregoing examples show that a reduction in penetration of about 4 units can be secured by adding a very small amount of hydrophobic silica to the oxidized wax, and that additional amounts of the silica will not effect a further reduction. The exact concentration of silica at which maximum reduction is reached may be expected to vary somewhat dependent upon the particular oxidized wax used and the size of the silica particles incorporated in the oxidation product but generally will be less than 3% silica by weight.

As previously stated, the silica used in practicing the invention should be hydrophobic or water repellent. Since silica normally is hydrophilic, the silica generally should be subjected to a suitable special treatment prior to incorporation in the oxidized wax in order to meet this requirement. Any known or suitable method for rendering the silica hydrophobic may be used for this purpose. For instance, the silica may be treated with a silane compound as described in Hirschler Patent 2,614,135; or it may be treated with an alkyd resin or an organo silicon polymer as described in Sirianni et al. Patents 2,583,605 and 2,583,606. Other procedures for preparing hydrophobic silica, such as that described in Montenyold et al. Patent 2,614,993, likewise may be employed. The use of hydrophobic silica in accordance with the present invention prevents the silica from being affected by the water phase of the emulsion polish into which the silica-oxidized wax composition is incorporated.

Emulsion polish compositions containing oxidized wax as a component are known. The preparation of emulsion polishes with the silica-oxidized wax mixtures of the present invention may be done by means of formulations similar to those previously used with oxidized wax. Examples of such formulations may be found in U. S. Pat. Nos. 2,573,422 and 2,573,423.

Various polishing compositions of the prior art have included silica dust as an abrasive component. The hydrophobic silica employed in the present compositions is of such small particle size as to be completely non-abrasive, its use being for an entirely different purpose, namely, to effect a sharp increase in the penetration of the oxidized wax into which it is incorporated.

I claim:

1. A composition comprising an oxidized microcrystalline petroleum wax having a saponification value of at least 30 and a penetration less than 15 at 77° F., and having incorporated therein colloidal hydrophobic silica of particle size less than 0.1 micron in minor amount sufficient to substantially reduce the penetration.

2. A composition comprising an oxidized microcrystalline petroleum wax having a saponification value of 40–80, a melting point of 185–195° F. and a penetration of about 10–12 at 77° F., and having incorporated therein finely divided hydrophobic silica of particle size less than 0.1 micron in minor amount sufficient to reduce the penetration to about 6–8.

3. A composition comprising an oxidized microcrystalline petroleum wax having a saponification value of 40–80, a melting point of 185–195° F. and a penetration less than 15 at 77° F., and having incorporated therein finely divided hydrophobic silica of particle size less than 0.1 micron in amount less than 3% by weight but sufficient to substantially reduce the penetration.

References Cited in the file of this patent

UNITED STATES PATENTS

| | | |
|---|---|---|
| 2,483,113 | Terwilliger | Sept. 27, 1949 |
| 2,546,328 | Arabian et al. | Mar. 27, 1951 |
| 2,559,398 | Capell | July 3, 1951 |
| 2,567,315 | Bidant | Sept. 11, 1951 |
| 2,573,751 | Woodward | Nov. 6, 1951 |
| 2,597,871 | Iler | May 27, 1952 |
| 2,640,809 | Nelson | June 2, 1953 |
| 2,681,859 | Wenaas | June 22, 1954 |